United States Patent [19]

Merchant et al.

[11] Patent Number: 5,580,906

[45] Date of Patent: Dec. 3, 1996

[54] TERNARY AZEOTROPIC COMPOSITIONS

[75] Inventors: Abid N. Merchant, Wilmington, Del.; Barbara H. Minor, Elkton, Md.

[73] Assignee: E. I. Du Pont de Nemours and Company, Wilmington, Del.

[21] Appl. No.: 445,383

[22] Filed: May 19, 1995

[51] Int. Cl.$^6$ ............... C09K 5/04; C23G 5/028
[52] U.S. Cl. ............... 521/88; 62/114; 134/12; 134/31; 134/38; 134/39; 134/40; 252/67; 252/69; 252/364; 521/98; 521/117; 521/131; 510/256; 510/273; 510/365; 510/412
[58] Field of Search ............... 252/67, 69, 170, 252/171, 172, 364, DIG. 9

[56] References Cited

U.S. PATENT DOCUMENTS

| | | | |
|---|---|---|---|
| 5,064,559 | 11/1991 | Merchant et al. | 252/171 |
| 5,064,560 | 11/1991 | Merchant | 252/171 |
| 5,196,137 | 3/1993 | Merchant | 252/172 |
| 5,262,277 | 11/1993 | Sato | 430/283 |
| 5,275,669 | 1/1994 | Van Der Pey et al. | 134/42 |
| 5,298,083 | 3/1994 | Van Der Pey et al. | 134/42 |

FOREIGN PATENT DOCUMENTS

| | | |
|---|---|---|
| 5-148498A | 6/1993 | Japan . |
| 7-113098A | 5/1995 | Japan . |

*Primary Examiner*—Morton Foelak

[57] ABSTRACT

Azeotropic or azeotrope-like compositions of effective amounts of 1,1,1,2,3,4,4,5,5,5-decafluoropentane, heptane and an alcohol such as methanol, ethanol, n-propanol or isopropanol, to form an azeotropic or azeotrope-like composition are disclosed that are useful as cleaning agents, refrigerants, aerosol propellants, heat transfer media, gaseous dielectrics, fire extinguishing agents, expansion agents for polyolefins and polyurethanes and as power cycle working fluids.

4 Claims, No Drawings

TERNARY AZEOTROPIC COMPOSITIONS

FIELD OF THE INVENTION

This invention relates to compositions, or mixtures, of fluorinated hydrocarbons and more specifically to azeotropic or azeotrope-like compositions comprising effective amounts of 1,1,1,2,3,4,4,5,5,5-decafluoropentane, heptane and an alcohol such as methanol, ethanol, n-propanol or isopropanol to form an azeotropic or azeotrope-like composition. Such compositions are useful as cleaning agents, expansion agents for polyolefins and polyurethanes, refrigerants, aerosol propellants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Fluorinated hydrocarbons may also be used as refrigerants. In refrigeration applications, a refrigerant is often lost during operation through leaks in shaft seals, hose connections, solder joints, and broken lines. In addition, the refrigerant may be released to the atmosphere during maintenance procedures on refrigeration equipment. Accordingly, it is desirable to use a single fluorinated hydrocarbon or an azeotropic or azeotrope-like composition that includes one or more fluorinated hydrocarbons as a refrigerant. Some nonazeotropic compositions that include one or more fluorinated hydrocarbons may also be used as refrigerants, but they have the disadvantage of changing composition, or fractionating, when a portion of the refrigerant charge is leaked or discharged to the atmosphere. If a non-azeotropic composition contains a flammable component, the blend could become flammable because of such a change in composition. Refrigerant equipment operation could also be adversely affected due to the change in composition and vapor pressure that results from fractionation.

Azeotropic or azeotrope-like compositions of fluorinated hydrocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorinate hydrocarbons and azeotropic or azeotrope-like compositions of fluorinated hydrocarbons as propellant vapor pressure attenuators in aerosol systems. Azeotropic or azeotrope-like compositions, with their substantially constant compositions and vapor pressures, are useful as solvents and propellants in aerosols.

Azeotropic or azeotrope-like compositions that include fluorinated hydrocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricant on metal parts.

Azeotropic or azeotrope-like compositions that include fluorinated hydrocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

Some of the fluorinated hydrocarbons that are currently used in these applications have been theoretically linked to depletion of the earth's ozone layer and to global warming. What is needed, therefore, are substitutes for fluorinated hydrocarbons that have low ozone depletion potentials and low global warming potentials.

SUMMARY OF THE INVENTION

The present invention relates to the discovery of azeotropic or azeotrope-like compositions comprising admixtures of effective amounts of 1,1,1,2,3,4,4,5,5,5-decafluoropentane, heptane and an alcohol such as methanol, ethanol, n-propanol or isopropanol to form an azeotropic or azeotrope-like composition.

DETAILED DESCRIPTION

The compositions of the instant invention are constant boiling, azeotropic or azeotrope-like compositions, or mixtures, comprising effective amounts of 1,1,1,2,3,4,4,5,5,5-decafluoropentane (HFC-43-10mee, boiling point=53.6° C.) heptane (boiling point=98.4° C.) and an alcohol such as methanol (boiling point=64.7° C.), ethanol (boiling point=78.4° C.), n-propanol (boiling point=97.2° C.) or isopropanol (boiling point=82.4° C.) to form an azeotropic or azeotrope-like composition.

Effective amounts of 1,1,1,2,3,4,4,5,5,5-decafluoropentane, heptane and an alcohol such as methanol, ethanol, n-propanol or isopropanol to form an azeotropic or azeotrope-like composition, when defined in terms of weight percent of the components at a specific pressure or temperature, include the following.

Substantially constant-boiling, azeotropic or azeotrope-like compositions of HFC-43-10mee, heptane and methanol comprise about 81.9 to 89.9 weight percent HFC-43-10mee, about 4.8 to 9.8 weight percent heptane, and about 4.8 to 8.8 weight percent methanol. These compositions boil at about 47.0°±0.1° C., at substantially atmospheric pressure. A preferred composition comprises about 85.1 to 86.7 weight percent HFC-43-10mee, 6.8 to 7.8 weight percent heptane, and about 6.4 to 7.2 weight percent methanol. A more preferred composition is the azeotrope, which comprises about 85.9 weight percent HFC-43-10mee, about 7.3 weight percent heptane, and about 6.8 weight percent methanol, and which boils at about 47.0° C., at substantially atmospheric pressure.

Substantially constant-boiling, azeotropic or azeotrope-like compositions of HFC-43-10mee, heptane and ethanol comprise about 89.0 to 92.0 weight percent HFC-43-10mee, about 4.4 to 6.4 weight percent heptane, and about 3.6 to 4.6 weight percent ethanol. These compositions boil at about 51.0°±1.9° C., at substantially atmospheric pressure. A preferred composition comprises about 90.2 to 90.8 weight percent HFC-43-10mee, 5.2 to 5.6 weight percent heptane, and about 4.0 to 4.2 weight percent ethanol. A more preferred composition is the azeotrope, which comprises about 90.5 weight percent HFC-43-10mee, about 5.4 weight percent heptane, and about 4.1 weight percent ethanol, and which boils at about 51.0° C., at substantially atmospheric pressure.

Substantially constant-boiling, azeotropic or azeotrope-like compositions of HFC-43-10mee, heptane and n-propanol comprise about 91.6 to 95.6 weight percent HFC-43-10mee, about 4.1 to 7.1 weight percent heptane, and about 0.1 to 1.8 weight percent n-propanol. These compositions boil at about 53.5°±1.6° C., at substantially atmospheric pressure. A preferred composition comprises about 93.2 to 94.0 weight percent HFC-43-10mee, 5.3 to 5.9 weight percent heptane, and about 0.6 to 1.0 weight percent n-propanol. A more preferred composition is the azeotrope, which comprises about 93.6 weight percent HFC-43-10mee, about 5.6 weight percent heptane, and about 0.8 weight percent n-propanol, and which boils at about 53.5° C., at substantially atmospheric pressure.

Substantially constant-boiling, azeotropic or azeotrope-like compositions of HFC-43-10mee, heptane and isopropanol comprise about 89.8 to 93.8 weight percent HFC-43-10mee, about 4.2 to 6.2 weight percent heptane, and about 1.5 to 4.5 weight percent isopropanol. These compositions boil at about 52.8°±1.2° C., at substantially atmospheric pressure. A preferred composition comprises about 91.4 to 92.2 weight percent HFC-43-10mee, 5.0 to 5.4 weight percent heptane, and about 2.7 to 3.3 weight percent isopropanol. A more preferred composition is the azeotrope, which comprises about 91.8 weight percent HFC-43-10mee, about 5.2 weight percent heptane, and about 3.0 weight percent isopropanol, and which boils at about 52.8° C., at substantially atmospheric pressure.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at pressures other than the pressure described herein.

By "azeotropic or azeotrope-like" composition is meant a constant boiling, or substantially constant boiling, liquid admixture of two or more substances that behaves as a single substance. One way to characterize an azeotropic or azeotrope-like composition is that the vapor produced by partial evaporation or distillation of the liquid has substantially the same composition as the liquid from which it was evaporated or distilled, that is, the admixture distills/refluxes without substantial composition change. Constant boiling or substantially constant boiling compositions, which are characterized as azeotropic or azeotrope-like, exhibit either a maximum or minimum boiling point, as compared with that of the nonazeotropic mixtures of the same components.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of the following criteria:

(a) The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition, (b) It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes, (c) The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure, or (d) An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The following ternary compositions are characterized as azeotropic or azeotrope-like in that mixtures within this range exhibit a substantially constant boiling point at substantially atmospheric pressure. Being substantially constant boiling, the mixtures do not tend to fractionate to any great extent upon evaporation. After evaporation, only a small difference exists between the composition of the vapor and the composition of the initial liquid phase. This difference is such that the compositions of the vapor and liquid phases are considered substantially identical. Accordingly, any compositions within this range exhibit properties which are characteristic of a true ternary azeotrope.

1. About 81.9 to 89.9 weight percent HFC-43-10mee, about 4.8 to 9.8 weight percent heptane, and about 4.8 to 8.8 weight percent methanol;
2. About 89.0 to 92.0 weight percent HFC-43-10mee, about 4.4 to 6.4 weight percent heptane, and about 3.6 to 4.6 weight percent ethanol;
3. About 91.6 to 95.6 weight percent HFC-43-10mee, about 4.1 to 7.1 weight percent heptane, and about 0.1 to 1.8 weight percent n-propanol; and
4. About 89.8 to 93.8 weight percent HFC-43-10mee, about 4.2 to 6.2 weight percent heptane, and about 1.5 to 4.5 weight percent isopropanol.

The following ternary compositions have been established, within the accuracy of the fractional distillation method, as true ternary azeotropes at substantially atmospheric pressure.

1. About 85.9 weight percent HFC-43-10mee, about 7.3 weight percent heptane, and about 6.8 weight percent methanol;
2. About 90.5 weight percent HFC-43-10mee, about 5.4 weight percent heptane, and about 4.1 weight percent ethanol;
3. About 93.6 weight percent HFC-43-10mee, about 5.6 weight percent heptane, and about 0.8 weight percent n-propanol; and
4. About 91.8 weight percent HFC-43-10mee, about 5.2 weight percent heptane, and about 3.0 weight percent isopropanol.

The aforestated azeotropes have low ozone-depletion potentials and are expected to decompose almost completely, prior to reaching the stratosphere.

The azeotropic or azeotrope-like compositions of the instant invention permit easy recovery and reuse of the solvent from vapor defluxing and degreasing operations because of their azeotropic natures. As an example, the azeotropic mixtures of this invention can be used in cleaning processes such as described in U.S. Pat. No. 3,881,949, or as a buffing abrasive detergent.

In addition, the mixtures are useful as resist developers, where chlorine-type developers would be used, and as resist stripping agents with the addition of appropriate halocarbons.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

A further aspect of the invention includes aerosol compositions comprising an active agent and a propellant, wherein the propellant is an azeotropic mixture of the invention; and the production of these compositions by combining said ingredients. The invention further comprises cleaning solvent compositions comprising the azeotropic mixtures of the invention.

The azeotropic or azeotrope-like compositions of the instant invention can be prepared by any convenient method including mixing or combining the desired component amounts. A preferred method is to weigh the desired component amounts and thereafter combine them in an appropriate container.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

EXAMPLE 1

A solution containing 84.0 weight percent HFC-43-10mee, 8.0 weight heptane and 8.0 weight percent methanol was prepared in a suitable container and mixed thoroughly.

The solution was distilled in a five plate Oldershaw distillation column using a 10:1 reflux to take-off ratio. Head and pot temperatures were read directly to 1° C. The pressure was at 767.24 mmHg. Distillate compositions were determined by gas chromatography. Results obtained are summarized in Table 1.

TABLE 1

| Cuts | Temp. °C. Head | Wt. % Distilled or Recovered | Weight Percentages | | |
|---|---|---|---|---|---|
| | | | HFC-43-10mee | Heptane | Methanol |
| 1 | 47 | 10.4 | 86.3 | 7.0 | 6.7 |
| 2 | 47 | 20.3 | 85.7 | 7.4 | 6.9 |
| 3 | 47 | 30.5 | 85.6 | 7.4 | 7.0 |
| 4 | 47 | 40.8 | 85.8 | 7.3 | 6.9 |
| 5 | 47 | 51.0 | 86.1 | 7.2 | 6.7 |
| 6 | 48 | 61.0 | 85.3 | 7.6 | 7.1 |
| 7 | 47 | 71.0 | 85.2 | 7.7 | 7.1 |
| 8 | 48 | 81.3 | 85.1 | 7.8 | 7.1 |
| HEEL | — | 90.8 | 66.5 | 14.8 | 18.7 |

Analysis of the above data indicates very small differences between head temperatures and distillate compositions as the distillation progressed. A statistical analysis of the data indicates that the true ternary azeotrope of HFC-43-10mee, heptane and methanol has the following characteristics at atmospheric pressure (99 percent confidence limits):

HFC-43-10mee=85.9±0.8
Heptane=7.3±0.5
Methanol=6.8±0.4
Boiling Point, °C.=47.0±0.1

EXAMPLE 2

A solution containing 89.2 weight percent HFC-43-10mee, 6.3 weight percent heptane and 4.5 weight percent ethanol was prepared in a suitable container and mixed thoroughly.

The solution was distilled in a five plate Oldershaw distillation column using a 10:1 reflux to take-off ratio. Head and pot temperatures were read directly to 1° C. The pressure was at 751.5 mmHg. Distillate compositions were determined by gas chromatography. Results obtained are summarized in Table 2.

TABLE 2

| Cuts | Temp. °C. Head | Wt. % Distilled or Recovered | Weight Percentages | | |
|---|---|---|---|---|---|
| | | | HFC-43-10mee | Heptane | Ethanol |
| 1 | 50 | 7.9 | 90.7 | 5.3 | 4.0 |
| 2 | 51 | 15.7 | 90.6 | 5.3 | 4.1 |
| 3 | 51 | 23.8 | 90.5 | 5.4 | 4.1 |
| 4 | 51 | 31.7 | 90.5 | 5.4 | 4.1 |
| 5 | 52 | 39.6 | 90.5 | 5.4 | 4.1 |
| 6 | 51 | 48.0 | 90.4 | 5.5 | 4.1 |
| 7 | 51 | 56.0 | 90.4 | 5.5 | 4.1 |
| 8 | 51 | 63.9 | 90.3 | 5.5 | 4.2 |
| HEEL | — | 89.5 | 85.5 | 8.7 | 5.8 |

Analysis of the above data indicates very small differences between head temperatures and distillate compositions as the distillation progressed. A statistical analysis of the data indicates that the true ternary azeotrope of HFC-43-10mee, heptane and ethanol has the following characteristics at atmospheric pressure (99 percent confidence limits):

HFC-43-10mee=90.5±0.3
Heptane=5.4±0.2
Ethanol=4.1±0.1
Boiling Point, °C.=51.0±1.9

EXAMPLE 3

A solution containing 92.1 weight percent HFC-43-10mee, 6.6 weight percent heptane and 1.3 weight percent n-propanol was prepared in a suitable container and mixed thoroughly.

The solution was distilled in a five plate Oldershaw distillation column using a 10:1 reflux to take-off ratio. Head and pot temperatures were read directly to 1° C. The pressure was at 762.26 mmHg. Distillate compositions were determined by gas chromatography. Results obtained are summarized in Table 3.

TABLE 3

| Cuts | Temp. °C. Head | Wt. % Distilled or Recovered | Weight Percentages | | |
|---|---|---|---|---|---|
| | | | HFC-43-10mee | Heptane | n-Propanol |
| 1 | 53 | 10.0 | 93.8 | 5.5 | 0.7 |
| 2 | 53 | 20.2 | 93.7 | 5.6 | 0.7 |
| 3 | 53 | 30.3 | 93.7 | 5.5 | 0.8 |
| 4 | 54 | 40.5 | 93.5 | 5.7 | 0.8 |
| 5 | 54 | 50.8 | 93.6 | 5.6 | 0.8 |
| 6 | 54 | 61.0 | 93.4 | 5.7 | 0.9 |
| 7 | 54 | 71.0 | 93.0 | 5.6 | 0.9 |
| 8 | 54 | 81.2 | 93.1 | 5.8 | 1.1 |
| HEEL | — | 89.1 | 78.1 | 16.0 | 5.8 |

Analysis of the above data indicates very small differences between head temperatures and distillate compositions as the distillation progressed. A statistical analysis of the data indicates that the true ternary azeotrope of HFC-43-10mee, heptane and n-propanol has the following characteristics at atmospheric pressure (99 percent confidence limits):

HFC-43-10mee=93.6±0.4
Heptane=5.6±0.3
n-propanol=0.8±0.2
Boiling Point, °C.=53.5±1.6

EXAMPLE 4

A solution containing 89.8 weight percent HFC-43-10mee, 5.9 weight percent heptane and 4.3 weight percent isopropanol was prepared in a suitable container and mixed thoroughly.

The solution was distilled in a five plate Oldershaw distillation column using a 10:1 reflux to take-off ratio. Head and pot temperatures were read directly to 1° C. The pressure was at 762.63 mmHg. Distillate compositions were determined by gas chromatography. Results obtained are summarized in Table 4.

TABLE 4

| Cuts | Temp. °C. Head | Wt. % Distilled or Recovered | Weight Percentages | | |
|---|---|---|---|---|---|
| | | | HFC-43-10mee | Heptane | Isopropanol |
| 1 | 52 | 10.3 | 92.0 | 5.1 | 2.9 |
| 2 | 53 | 20.7 | 91.8 | 5.2 | 3.0 |
| 3 | 53 | 30.8 | 91.7 | 5.3 | 3.0 |
| 4 | 53 | 40.7 | 91.7 | 5.3 | 3.0 |
| 5 | 53 | 50.4 | 91.7 | 5.2 | 3.1 |
| 6 | 53 | 60.2 | 91.6 | 5.3 | 3.1 |
| 7 | 53 | 70.4 | 91.6 | 5.2 | 3.2 |
| 8 | 53 | 80.4 | 91.6 | 5.2 | 3.2 |
| HEEL | — | 89.3 | 71.5 | 12.1 | 16.4 |

Analysis of the above data indicates very small differences between head temperatures and distillate compositions as the distillation progressed. A statistical analysis of the data indicates that the true ternary azeotrope of HFC-43-10mee, heptane and isopropanol has the following characteristics at atmospheric pressure (99 percent confidence limits):

HFC-43-10mee=91.8±0.4
Heptane=5.2±0.2
Isopropanol=3.0±0.3
Boiling Pt, °C.=52.8±1.2

EXAMPLE 5

A suitable container was filled with azeotropic mixtures cited in the previous examples and heated to the boiling point. A stainless steel nut coated with various residues was suspended in the container for 10 seconds, then removed and observed. Results are reported in Table 1. In most cases, residue was completely removed. In cases where a small amount of residue remained, further removal can be achieved with ultrasonic cleaning.

TABLE 5

| | RESIDUES | | | |
|---|---|---|---|---|
| WT. PERCENTS | Silicone Oil | Kleen Kool Oil | Hydraulic Fluid Mil-H-83282 | Water/Oil Mix |
| HFC-43-10mee/ Heptane/ Methanol 85.9/7.3/6.8 | No Residue Observed | No Residue Observed | No Residue Observed | No Residue Observed |
| BFC-43-10mee/ Heptane/ Ethanol 90.5/5.4/4.1 | No Residue Observed | No Residue Observed | 80% Residue Removed | No Residue Observed |
| HFC-43-10mee/ Heptane/ N-propanol 93.6/5.6/0.8 | No Residue Observed | Slight Residue Observed | 50% Residue Removed | No Residue Observed |

TABLE 5-continued

| | RESIDUES | | | |
|---|---|---|---|---|
| WT. PERCENTS | Silicone Oil | Kleen Kool Oil | Hydraulic Fluid Mil-H-83282 | Water/Oil Mix |
| HFC-43-10mee/ Heptane/ Iso-propanol 91.8/5.2/3.0 | No Residue Observed | Slight Residue Observed | Slight Residue Observed | 75% Residue Removed |

ADDITIONAL COMPOUNDS

Other components, such as aliphatic hydrocarbons having a boiling point of 35°–85° C., hydrofluorocarbonalkanes having a boiling point of 35°–85° C., hydrofluoropropanes having a boiling point of between 35°–85° C., hydrocarbon esters having a boiling point between 30°–80° C., hydrochlorofluorocarbons having a boiling point between 25°–85° C., hydrofluorocarbons having a boiling point of 25°–85° C., hydrochlorocarbons having a boiling point between 35°–85° C., chlorocarbons and perfluorinated compounds, can be added to the azeotropic or azeotrope-like compositions described above without substantially changing the properties thereof, including the constant boiling behavior, of the compositions. Examples of such components, which typically do not exceed about 10 weight percent of the total composition, include the following:

| COMPOUND | FORMULA | boiling point, °C. |
|---|---|---|
| HCFC-123 | CHCl$_2$CF$_3$ | 27 |
| HCFC-141b | CFCl$_2$CH$_3$ | 32 |
| HCFC-225aa | CHF$_2$CCl$_2$CF$_3$ | 53 |
| HCFC-225ca | CHCl$_2$CF$_2$CF$_3$ | 52 |
| HCFC-225cb | CHClFCF$_2$CF$_2$Cl | 56 |
| HCFC-225da | CClF$_2$CHClCF$_3$ | 50 |
| HFC-HFC-43-10mf | CF$_3$CH$_2$CF$_2$CF$_2$CF$_3$ | 52 |
| HFC-HFC-43-10mcf | CF$_3$CF$_2$CH$_2$CF$_2$CF$_3$ | 52 |
| FC-C-51-12 | cyclo-C$_4$F$_6$(CF$_3$)$_2$ | 45 |
| | CH$_3$OCF$_2$CHFCF$_3$ | 52 |
| HFC-C-456myc | cyclo-CH$_2$CH$_2$CF$_2$CF(CF$_3$) | |
| HFC-C-354 | cyclo-CF$_2$CF$_2$CH$_2$CH$_2$ | 50 |
| | C$_4$F$_9$CH=CH$_2$ | 58 |
| MEK | CH$_3$C(O)C$_2$H$_5$ | 80 |
| THF | cyclo-OC$_4$H$_8$ | 66 |
| methyl formate | HC(O)OCH$_3$ | 32 |
| ethyl formate | HC(O)OC$_2$H$_5$ | 54 |
| methyl acetate | CH$_3$C(O)OCH$_3$ | 56 |
| ethyl acetate | CH$_3$C(O)OC$_2$H$_5$ | 77 |
| cyclopentane | | 49 |
| acetone | | 56 |
| 1,2-dichloroethane | | 84 |
| acetonitrile | | 82 |
| methylene chloride | | 40 |

Additives such as lubricants, corrosion inhibitors, stabilizers, surfactants, dyes and other appropriate materials may be added to the novel compositions of the invention for a variety of purposes provided they do not have an adverse influence on the composition, for their intended applications. Examples of stabilizers include nitromethane and nitroethane.

We claim:

1. A composition comprising effective amounts of 1,1,1,2,3,4,4,5,5,5-decafluoropentane, heptane and an alcohol selected from the group consisting of methanol, ethanol, n-propanol and isopropanol, to form an azeotropic or azeotrope-like composition at substantially atmospheric pressure.

2. The composition of claim 1, consisting essentially of 81.9 to 89.9 weight percent 1,1,1,2,3,4,4,5,5,5-decafluoropentane, 4.8 to 9.8 weight percent heptane, and 4.8 to 8.8 weight percent methanol; 89.0 to 92.0 weight percent 1,1,1,2,3,4,4,5,5,5-decafluoropentane, 4.4 to 6.4 weight percent heptane, and 3.6 to 4.6 weight percent ethanol; 91.6 to 95.6 weight percent 1,1,1,2,3,4,4,5,5,5-decafluoropentane, 4.1 to 7.1 weight percent heptane, and 0.1 to 1.8 weight percent n-propanol; and 89.8 to 93.8 weight percent 1,1,1,2,3,4,4,5,5,5-decafluoropentane, 4.2 to 6.2 weight percent heptane, and 1.5 to 4.5 weight percent isopropanol.

3. The composition of claim 1, consisting essentially of 85.1 to 86.7 weight percent 1,1,1,2,3,4,4,5,5,5-decafluoropentane, 6.8 to 7.8 weight percent heptane, and 6.4 to 7.2 weight percent methanol; 90.2 to 90.8 weight percent 1,1,1,2,3,4,4,5,5,5-decafluoropentane, 5.2 to 5.6 weight percent heptane, and 4.0 to 4.2 weight percent ethanol; 93.2 to 94.0 weight percent 1,1,1,2,3,4,4,5,5,5-decafluoropentane, 5.3 to 5.9 weight percent heptane, and 0.6 to 1.0 weight percent n-propanol; and 91.4 to 92.2 weight percent 1,1,1,2,3,4,4,5,5,5-decafluoropentane, 5.0 to 5.4 weight percent heptane, and 2.7 to 3.3 weight percent isopropanol.

4. The composition of claim 1, consisting essentially of 85.9 weight percent 1,1,1,2,3,4,4,5,5,5-decafluoropentane, 7.3 weight percent heptane, and 6.8 weight percent methanol; 90.5 weight percent 1,1,1,2,3,4,4,5,5,5-decafluoropentane, 5.4 weight percent heptane, and 4.1 weight percent ethanol; 93.6 weight percent 1,1,1,2,3,4,4,5,5,5-decafluoropentane, 5.6 weight percent heptane, and 0.8 weight percent n-propanol; and 91.8 weight percent 1,1,1,2,3,4,4,5,5,5-decafluoropentane, 5.2 weight percent heptane, and 3.0 weight percent isopropanol.

* * * * *